US009331924B2

(12) United States Patent
Ichiki et al.

(10) Patent No.: US 9,331,924 B2
(45) Date of Patent: May 3, 2016

(54) DISTRIBUTION ROUTE CONSTRUCTION METHOD AND TERMINAL DEVICE

(75) Inventors: Atsushi Ichiki, Kawasaki (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 579 days.

(21) Appl. No.: 13/614,698

(22) Filed: Sep. 13, 2012

(65) Prior Publication Data

US 2013/0163414 A1 Jun. 27, 2013

(30) Foreign Application Priority Data

Dec. 21, 2011 (JP) ................................ 2011-280573

(51) Int. Cl.
*H04L 12/26* (2006.01)
*H04L 12/24* (2006.01)
*H04L 12/801* (2013.01)

(52) U.S. Cl.
CPC ............ *H04L 43/10* (2013.01); *H04L 41/0893* (2013.01); *H04L 47/10* (2013.01)

(58) Field of Classification Search
None
See application file for complete search history.

(56) References Cited

U.S. PATENT DOCUMENTS

| | | | | |
|---|---|---|---|---|
| 6,954,436 | B1 * | 10/2005 | Yip et al. | 370/254 |
| 7,016,351 | B1 * | 3/2006 | Farinacci et al. | 370/392 |
| 7,355,975 | B2 * | 4/2008 | Liu et al. | 370/235 |
| 7,389,332 | B1 * | 6/2008 | Muchow et al. | 709/220 |
| 7,457,236 | B2 * | 11/2008 | Cheng et al. | 370/220 |
| 7,593,374 | B2 * | 9/2009 | Zhang et al. | 370/338 |
| 7,680,038 | B1 * | 3/2010 | Gourlay | 370/230 |
| 7,742,436 | B2 * | 6/2010 | Carrillo et al. | 370/255 |
| 7,848,230 | B2 * | 12/2010 | Shah et al. | 370/229 |
| 7,986,632 | B2 * | 7/2011 | Monaco et al. | 370/248 |
| 7,991,859 | B1 * | 8/2011 | Miller et al. | 709/220 |
| 2002/0156875 | A1 * | 10/2002 | Pabla | 709/220 |
| 2003/0126464 | A1 * | 7/2003 | McDaniel et al. | 713/201 |
| 2004/0042465 | A1 * | 3/2004 | Lee | 370/395.52 |
| 2007/0115868 | A1 * | 5/2007 | Chen et al. | 370/315 |
| 2007/0177518 | A1 * | 8/2007 | Li et al. | 370/252 |
| 2007/0189216 | A1 * | 8/2007 | Wang | H04W 36/12 370/331 |
| 2007/0280283 | A1 * | 12/2007 | Sorrini et al. | 370/465 |
| 2008/0049753 | A1 * | 2/2008 | Heinze et al. | 370/392 |
| 2008/0212471 | A1 * | 9/2008 | Jowett | H04L 65/80 370/231 |
| 2009/0031222 | A1 * | 1/2009 | Nakamura et al. | 715/735 |
| 2009/0083390 | A1 * | 3/2009 | Abu-Ghazaleh et al. | 709/209 |
| 2009/0303882 | A1 * | 12/2009 | Tanaka et al. | 370/237 |
| 2009/0310485 | A1 * | 12/2009 | Averi et al. | 370/232 |
| 2010/0110891 | A1 * | 5/2010 | Shah et al. | 370/235 |

(Continued)

FOREIGN PATENT DOCUMENTS

JP 2006-345347 12/2006

*Primary Examiner* — Jeffrey M Rutkowski
*Assistant Examiner* — Jonathan B Wood
(74) *Attorney, Agent, or Firm* — Staas & Halsey LLP

(57) ABSTRACT

A distribution route construction method includes: transmitting, in a data distribution system, at least one check packet to a plurality of terminals within a network from a check packet transmission terminal; checking a reply packet from the plurality of terminals; grouping the plurality of terminals into a first terminal group including a first terminal whose reply packet reaches the check packet transmission terminal and a second terminal group including a second terminal whose reply packet does not reach the check packet transmission terminal; changing a designation terminal for data communication to reduce communication data traffic between the first terminal group and the second terminal group; and reconstructing distribution routes based on the checking and the changing.

17 Claims, 26 Drawing Sheets

(56) References Cited

U.S. PATENT DOCUMENTS

| | | | | |
|---|---|---|---|---|
| 2010/0128606 A1* | 5/2010 | Patel et al. | .................... | 370/235 |
| 2010/0177643 A1* | 7/2010 | Matta et al. | .................... | 370/248 |
| 2010/0309795 A1* | 12/2010 | Shah et al. | .................... | 370/252 |
| 2011/0022711 A1* | 1/2011 | Cohn | ............................ | 709/225 |

* cited by examiner

FIG. 10

| | | | |
|---|---|---|---|
| IP HEADER | UDP HEADER | SEQUENCE NUMBER | REPLY DESTINATION ADDRESS + PORT NUMBER |

DISTRIBUTION ROUTE CONSTRUCTION METHOD AND TERMINAL DEVICE

CROSS-REFERENCE TO RELATED APPLICATION(S)

This application is based upon and claims the benefit of priority of the prior Japanese Patent Application No. 2011-280573, filed on Dec. 21, 2011, the entire contents of which are incorporated herein by reference.

FIELD

The embodiment discussed herein is related to a distribution route construction method and a terminal device in a data distribution system.

BACKGROUND

In a data distribution system of client server type, the load of a distribution server increases with an increase in the number of data reception terminals. Since a capacity of a distribution server and a network infrastructure on which accesses are concentrated is large in a large-scaled data distribution system and a distribution cost increases, a data distribution method employing the P2P (peer-to-peer) technique is provided.

The related art is disclosed in Japanese Laid-open Patent Publication No. 2006-345347.

SUMMARY

According to one aspect of the embodiments, a distribution route construction method includes: transmitting, in a data distribution system, at least one check packet to a plurality of terminals within a network from a check packet transmission terminal; checking a reply packet from the plurality of terminals; grouping the plurality of terminals into a first terminal group including a first terminal whose reply packet reaches the check packet transmission terminal and a second terminal group including a second terminal whose reply packet does not reach the check packet transmission terminal; changing a designation terminal for data communication to reduce communication data traffic between the first terminal group and the second terminal group; and reconstructing distribution routes based on the checking and the changing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an exemplary check packet.

DESCRIPTION OF EMBODIMENT

In a streaming distribution method using the P2P technique, for example, a terminal that has received data transfers the data to another terminal. Each terminal operates as a repeater such that large-scaled broadcasting is performed. The load of a distribution server may not increase in some cases with an increase in the number of terminals.

The P2P data distribution may be regarded as data distribution on a logical network formed by logical links between terminals, or on an overlay network. For example, logical data distribution routes may be set regardless of a physical network configuration. In the P2P data distribution, the traffic volume of data streaming on a physical network is determined depending on the connection method between terminals on a logical network.

Figure 1:
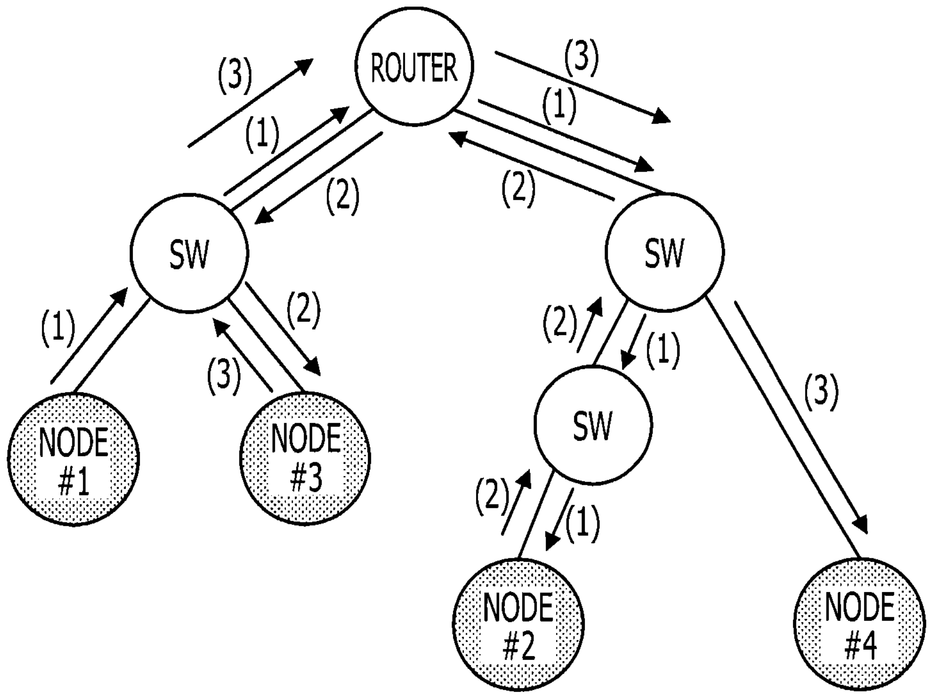
FIG. 1 illustrates an exemplary P2P data distribution.
Figure 2:
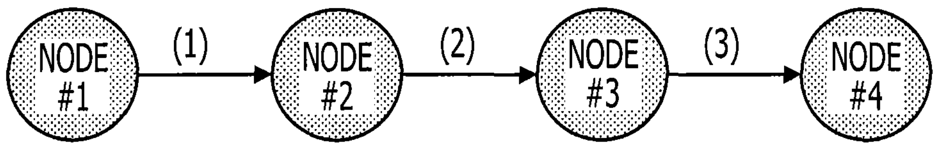
FIG. 2 illustrates an exemplary P2P data distribution.

FIGS. 1 to 4 illustrate an exemplary P2P data distribution. In a physical network illustrated in FIG. 1, four terminals, for example, nodes #1 to #4 are coupled via switching hubs (SW) and a router. When a logical network illustrated in FIG. 2 is constructed on the physical network illustrated in FIG. 1, each arrow denotes data streaming on the network of FIG. 1. Numerals in parentheses corresponding to the arrows in FIGS. 1 and 2 represent the sequence of distribution.

Connections between the node and the switch, between one switch and another switch, and between the switch and the router may be each called a path (or a link). The number of paths coupling two nodes, for example, may be called a path length. For example, the path length between the node #1 and the node #2 denoted by the arrow (1), illustrated in FIG. 1, may be 5.

Figure 3:
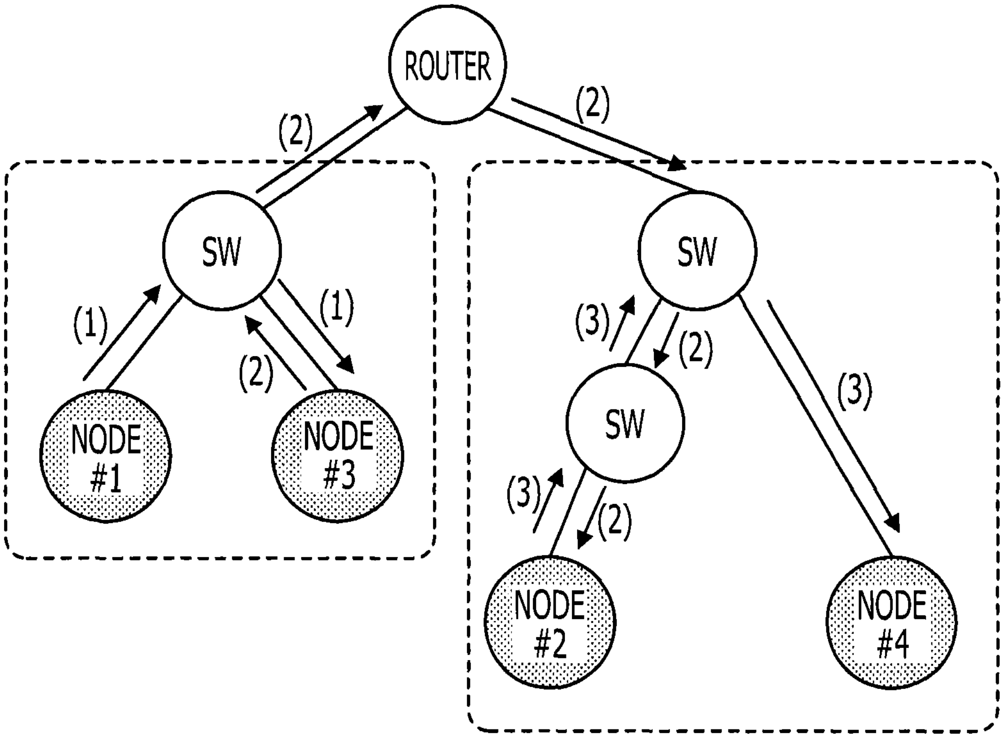
FIG. 3 illustrates an exemplary P2P data distribution.
Figure 4:
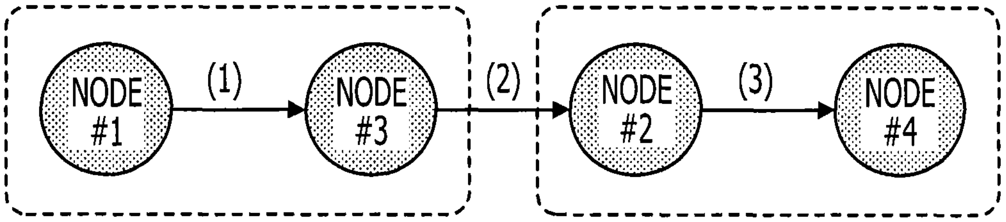
FIG. 4 illustrates an exemplary P2P data distribution.

The efficiency of the data distribution may increase when a sequence providing the data distribution with a shorter path length is properly selected. FIG. 3 illustrates a stream of data streaming on the physical network when a logical network illustrated in FIG. 4 is constructed from the logical network illustrated in FIG. 2. The path length (total) represented by all the arrows (1) to (3) illustrated in FIG. 1 is 14, whereas the path length (total) represented by all the arrows (1) to (3) illustrated in FIG. 3 is 10. Accordingly, the efficiency of the data distribution may increase.

In distribution of massive image data and so on, a physical network configuration may not be recognized. For example, a sub-network includes a switching hub in Layer 2 (L2). Therefore, a sequence of distribution, e.g., a data distribution route, which provides the data distribution with a shorter path length, may not be properly selected by using a tool, such as a "traceroute", that is adapted to recognize a path length in Layer 3 (L3).

Figure 5:
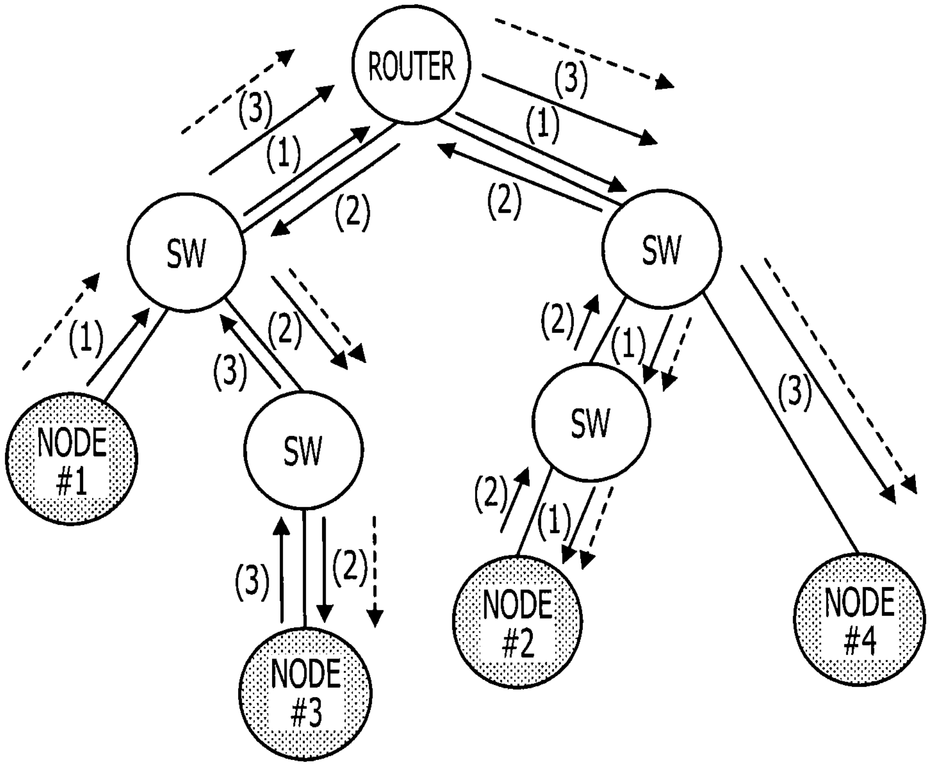
FIG. 5 illustrates an exemplary network.
Figure 6:
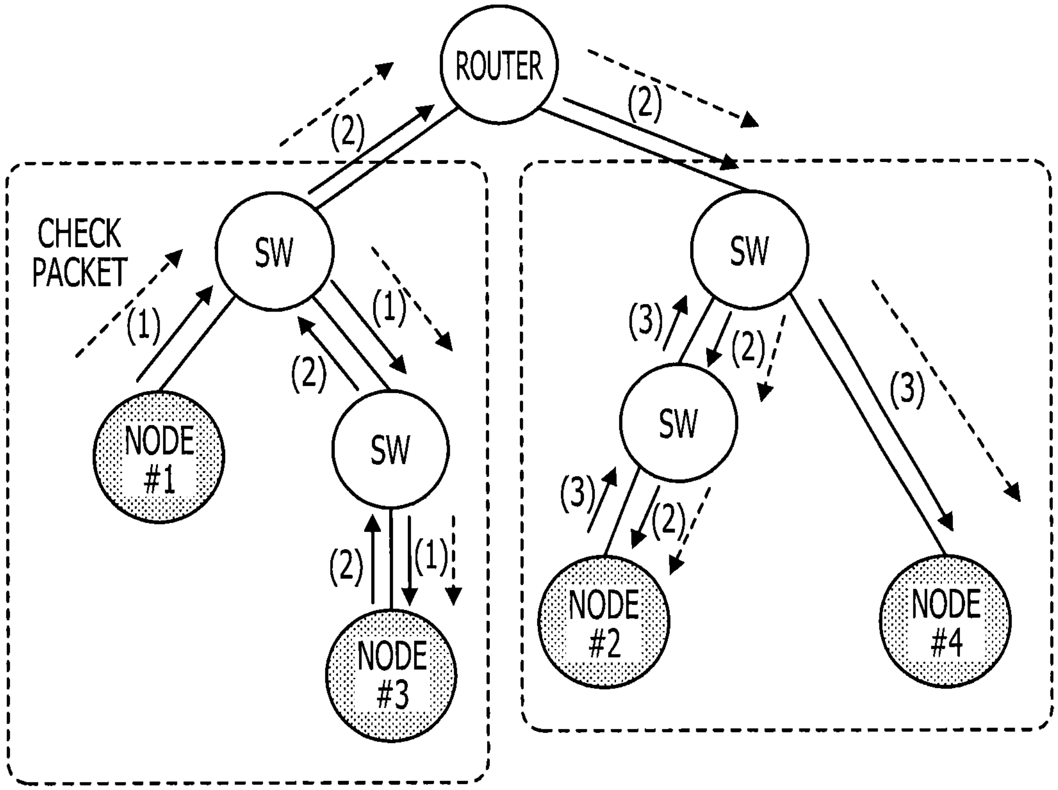
FIG. 6 illustrates an exemplary grouping.

FIG. 5 illustrates an exemplary network. The network illustrated in FIG. 5 may be coupled by using a Layer-2 device. Arrows associated with numerals in parentheses, illustrated in FIG. 5, represent individual data distribution routes, for example, streams of data on the P2P network, and the numerals in the parentheses denote the sequence of distribution. FIG. 6 illustrates an exemplary grouping.

For example, a node #1, which is arbitrary one of terminals, broadcasts a check packet to a plurality of terminals as denoted by dotted arrows, and each of the terminals, e.g., nodes #2 to #4, having received the check packet returns a reply to the node #1. The node #1 observes whether the reply is received. When there is one or more nodes from which the reply has not been received, e.g., when the reply has not been received from the node #2 and the node #4, the nodes are grouped, as illustrated in FIG. 6, into a group including the nodes from which the reply has been received, e.g., the nodes #1 and #3, and a group including the nodes from which the reply has not been received, e.g., the nodes #2 and #4. That grouping of the nodes is held as group information.

Communication partners are changed to reduce the data communication traffic, e.g., the number of paths, between the group (nodes #1 and #3) from which the reply has been received and the group (nodes #2 and #4) from which the reply has not been received. With repeated change of the communication partners, the P2P data distribution route is optimized.

When reply packets are received from all the terminals as check targets, the data volume of a check packet, e.g., the number of check packets, to be next transmitted is increased. This may increase a packet loss of the check packet due to congestion. A packet loss of actual data streaming on the P2P network may also occur at the same time. The influence of the packet loss may be reduced by using the packet-loss correction technique, such as Forward Error Correction (FEC) or Automatic Repeat reQuest (ARQ).

If a contradiction arises between a current group information, which includes the group having received the same check packet and the group having not received the same check packet, and a previous group information when the current group information is stored, an increase in the data volume of the check packet may be temporarily stopped. For example, in FIG. 5, when the reply packets have not been returned from the nodes #2 and #3, the group information is stored in the form of (nodes #1, #4) (nodes #2, #3). The group information obtained with the result of a new check, e.g., (nodes #1, #3) (nodes #2, #4) obtained when the reply packets have not been returned from the nodes #2 and #4, may contradict the above-mentioned previous group information. In that case, the increase in the data volume of the check packet may be temporarily stopped to check which one of two types of the group information is true.

If a contradiction between the current group information, which includes the group having received the same check packet and the group having not received the same check packet, and the previous group information is resolved when the current group information is stored, the increase in the data volume of the check packet is resumed. For example, when the reply packets have not been returned from the nodes #2 and #4 at a high frequency as a result of continuing the check in the contradictory situation, it is estimated that the group information of (nodes #1, #3) (nodes #2, #4) is true, whereby the contradiction is resolved. Thus, the increase in the data volume of the check packet is resumed.

When the current group information is stored, the group information, which includes the group having received the check packet and the group having not received the check packet, may not be changed. For example, in FIG. 6, the state where the reply is not returned from the nodes #2 and #4, as illustrated, may continue. The node #1 designates the node #2, for example, as a new terminal for transmitting the check packet, from the group (nodes #2 and #4) having not received the check packet. The node #2, for example, a terminal newly designated as a node transmitting the check packet, starts multicasting of the check packet from the data volume of the check packet immediately before the designation.

Figure 7:
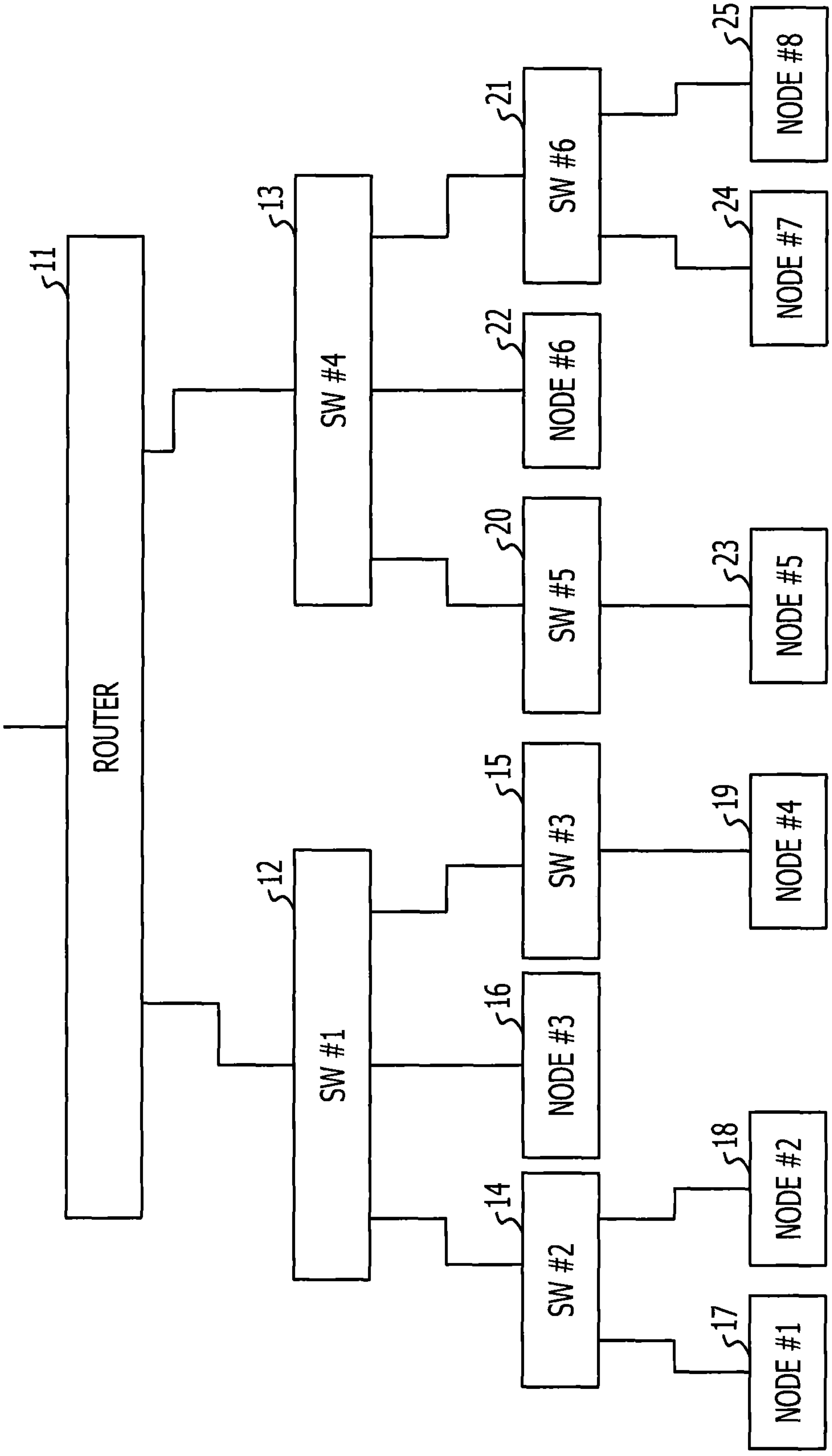
FIG. 7 illustrates an exemplary network.

FIG. 7 illustrates an exemplary network. FIG. 7 illustrates a physical network configuration. A router 11 in a sub-network illustrated in FIG. 7 is coupled to another sub-network and Layer-2 switches (SW#1, SW#4) 12 and 13. Layer-2 switches (SW#2, SW#3) 14 and 15 and a terminal 16, serving as a node #3, are coupled to the switch 12. Terminals 17 and 18, serving respectively as nodes #1 and #2, are coupled to the switch 14. A terminal 19, serving as a node #4, is coupled to the switch 15.

Layer-2 switches (SW#5, SW#6) 20 and 21 and a terminal 22, serving as a node #6, are coupled to the switch 13. A terminal 23, serving as a node #5 is coupled to the switch 20. Terminals 24 and 25, serving respectively as nodes #7 and #8, are coupled to the switch 21.

The sub-network illustrated in FIG. 7 may be a P2P distribution network, and is used, for example, to distribute image data in real time. Full duplex communication may be performed within the sub-network.

Figure 8:
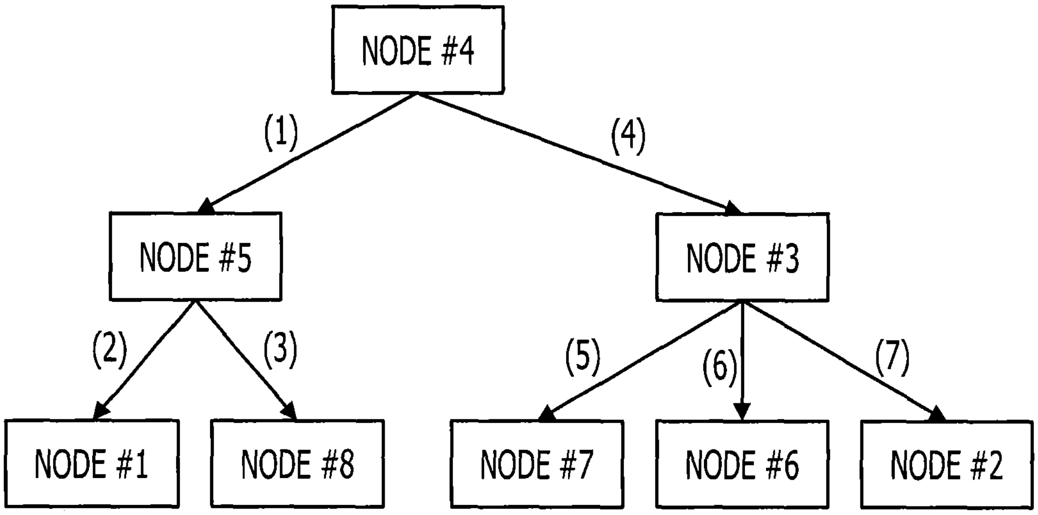
FIG. 8 illustrates an exemplary data distribution route.

FIG. 8 illustrates an exemplary data distribution route. Logical data distribution routes on a P2P network may be illustrated in FIG. 8. Arrows associated with numerals in parentheses represent individual data distribution routes, for exemple, streams of data on the P2P network, and the numerals in parentheses denote individual route numbers. The meaning of the arrows associated with the numerals in parentheses is similarly applied to other drawings described below.

Figure 9:
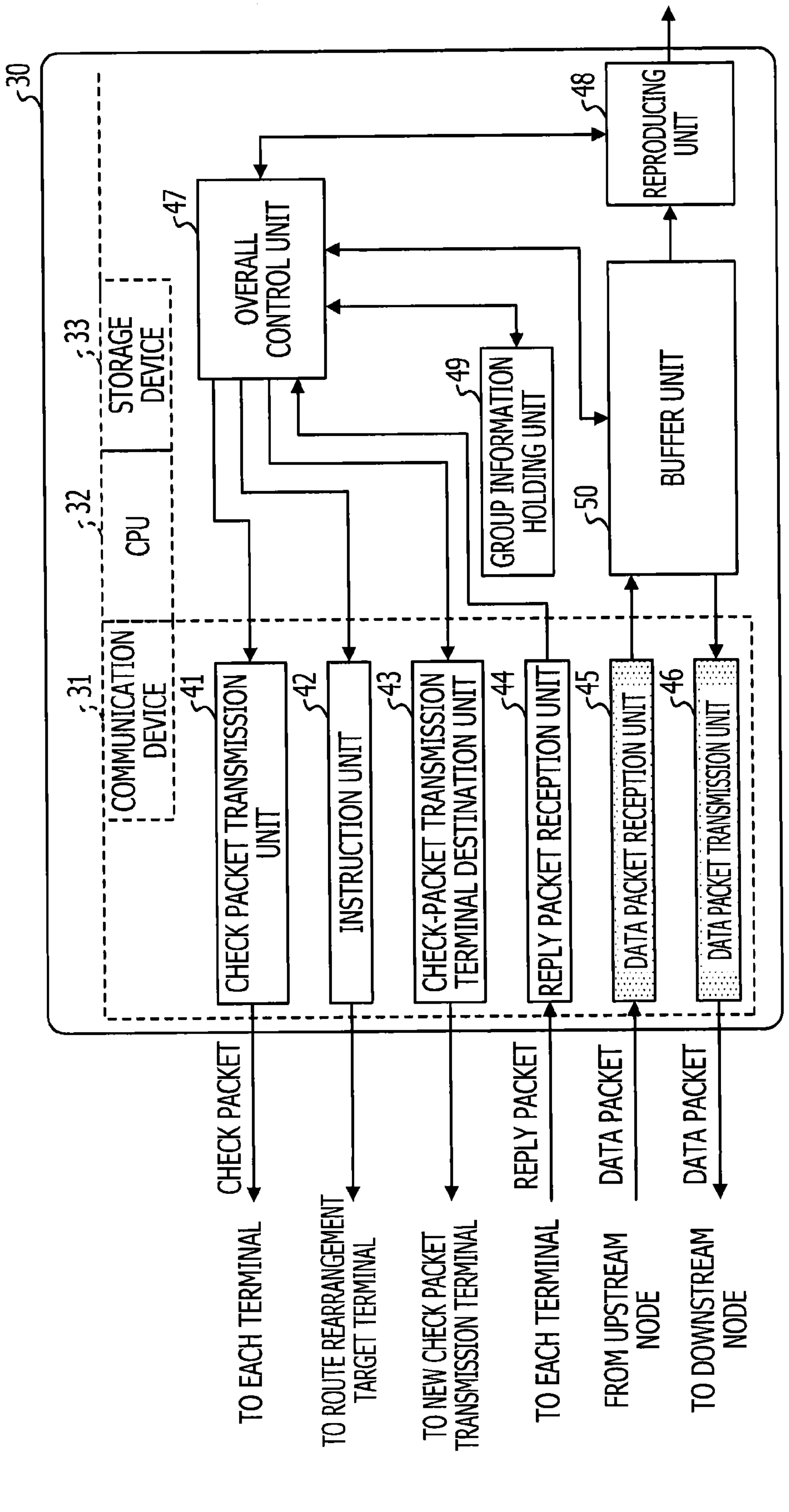
FIG. 9 illustrates an exemplary terminal device.

FIG. 9 illustrates an exemplary terminal device. A hardware configuration of the terminal device, serving as a node, may be illustrated in FIG. 9. A terminal device 30 includes a communication device 31, a CPU 32, and a storage device 33. The terminal device 30 may further include one or more of an input device, a secondary storage device, an output device, etc. depending on the cases.

The communication device 31 may include a check packet transmission unit 41, an instruction unit 42, a check-packet transmission terminal destination unit 43, a reply packet reception unit 44, a data packet reception unit 45, and a data packet transmission unit 46. The check packet transmission unit 41 transmits the check packet to each terminal in accordance with control of an overall control unit 47.

The instruction unit 42 transmits an instruction for route rearrangement to target terminal whose route is to be arranged in accordance with control of the overall control unit 47. The check-packet transmission terminal destination unit 43 transmits, to a desired terminal, information designating the desired terminal to become a check packet transmission terminal, in accordance with control of the overall control unit 47. The reply packet reception unit 44 receives a reply packet from each terminal and supplies the reply packet to the overall control unit 47. The data packet reception unit 45 receives data packet including media data, etc. that is transmitted from a terminal as an upstream node. The data packet transmission unit 46 transmits data packet including media data, etc., to a terminal as a downstream node.

The CPU 32 may function as the overall control unit 47 or a reproducing unit 48 by executing programs stored in the storage device 33. The storage device 33 stores the programs and functions as a group information holding unit 49 or a buffer unit 50.

The overall control unit 47 executes a processing program to construct distribution routes and controls the entire terminal device. The reproducing unit 48 decodes or reproduces data having been temporarily buffered in the buffer unit 50, and outputs an image signal, a sound signal, etc. The group information holding unit 49 stores the group information, including a frequency counter, and an end-of-optimization counter. The buffer unit 50 temporarily buffers the received data packet.

FIG. 10 illustrates an exemplary check packet. The check packet may be a User Datagram Protocol (UDP) packet. The check packet is assigned with a sequence number that is incremented by one each time transmitting the check packet following an Internet Protocol (IP) header and a UDP header, for exemple, for each packet. After the sequence number, a reply destination address and a port number, e.g., an address and a port number of a transmission source terminal, are added.

Figure 11:
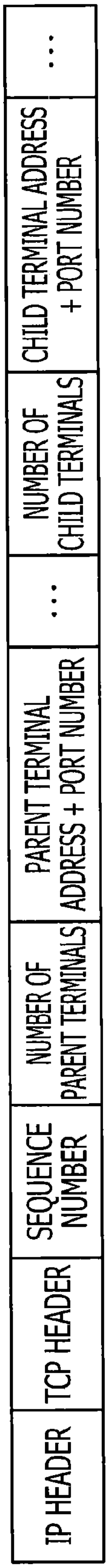
FIG. 11 illustrates an exemplary reply packet.

FIG. 11 illustrates an exemplary reply packet. The reply packet may be a Transmission Control Protocol (TCP) packet. The sequence number extracted from the received check packet is assigned to the reply packet, following an IP header and a TCP header. After the sequence number, the number of parent terminals and pairs of parent terminal addresses and port numbers corresponding to the number of parent terminals are added. Further, the number of child terminals and pairs of child terminal addresses and port numbers corresponding to the number of parent terminals are added. For a certain terminal, the parent terminal indicates a terminal that transmits the data packet to the certain terminal, and the child terminal indicates a terminal to which the certain terminal transmits the data packet. Because the sequence number extracted from the check packet is assigned to the reply packet, a loss of the reply packet may be detected in the terminal that has transmitted the check packet.

The check packet is broadcast or multi-cast to each terminal in the sub-network from the check packet transmission terminal independently of the distribution of data, such as images. When each terminal in the sub-network receives the check packet that is periodically broadcast or multi-cast from the check packet transmission terminal in accordance with the UDP, it transmits the reply packet to the transmission source in accordance with the TCP. Therefore, when the reply packet is not returned to the transmission side, it is estimated that congestion arises in a route to the relevant terminal.

The check packet transmission terminal recognizes the logical network configuration within the sub-network. For example, by assigning the reply packet with information of the parent terminal (data transmission source) and the child terminal (data transmission destination) with respect to the relevant terminal as illustrated in FIG. 11, the logical network configuration may be recognized in the check packet transmission terminal.

Figure 12:
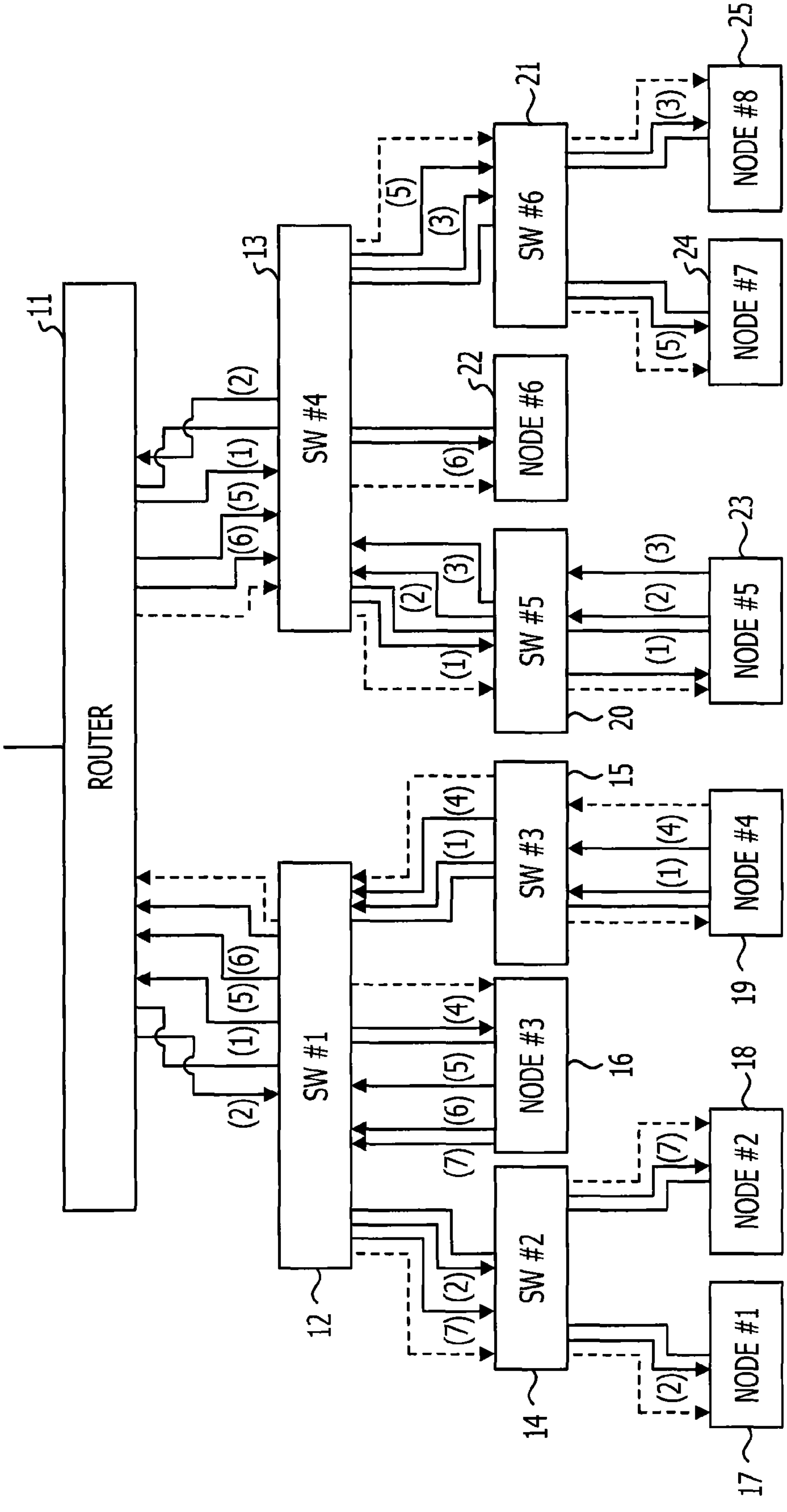
FIG. 12 illustrates an exemplary data distribution route.

FIG. 12 illustrates an exemplary distribution route. In FIG. 12, the physical network configuration illustrated in FIG. 7 and the logical data distribution routes illustrated in FIG. 8 may be superimposed with each other. A total path length of the distribution routes represented by arrows (1) to (7) illustrated in FIG. 12 may be 31.

Figure 13:
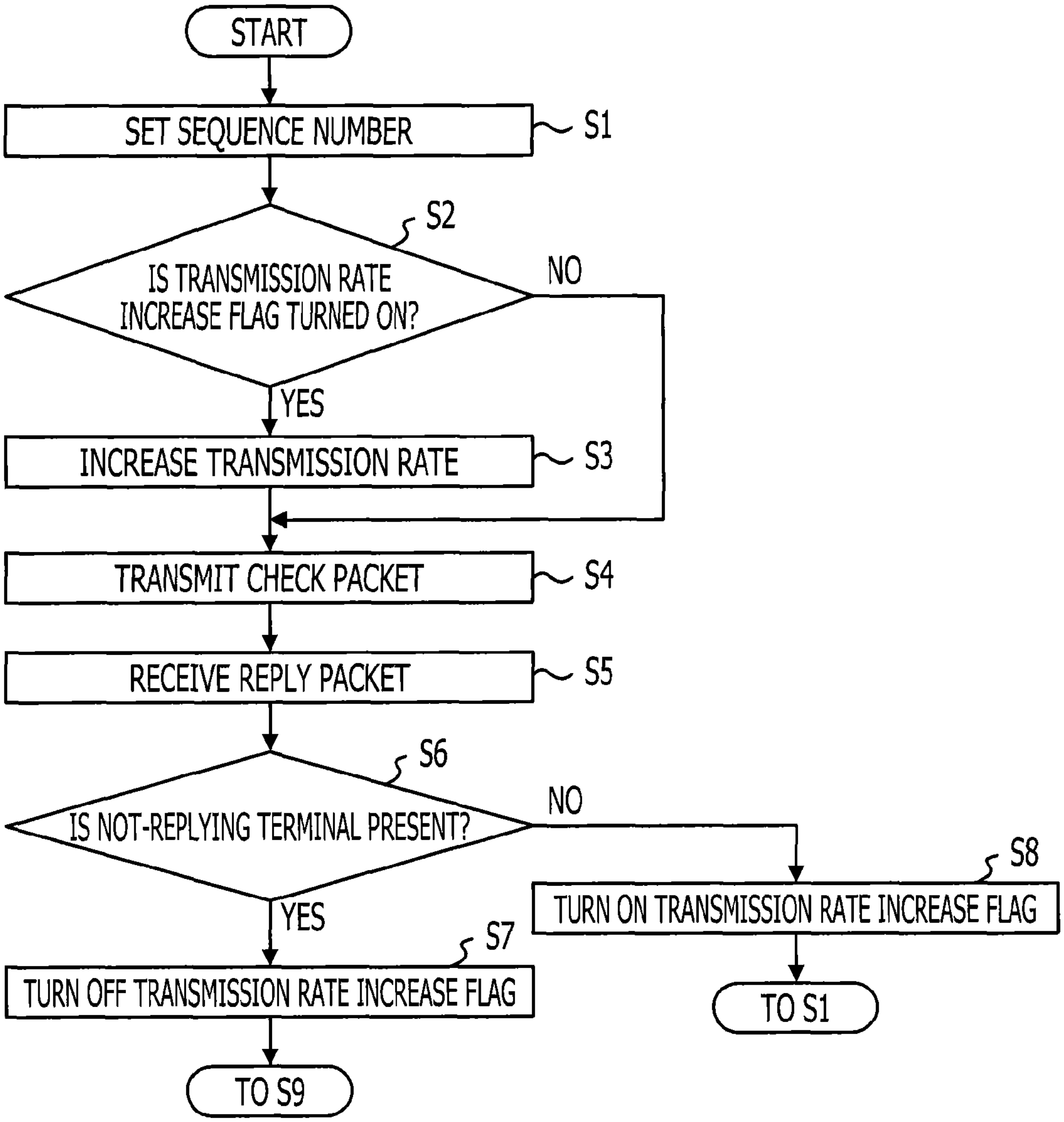
FIG. 13 illustrates an exemplary distribution route construction process.
Figure 14A:
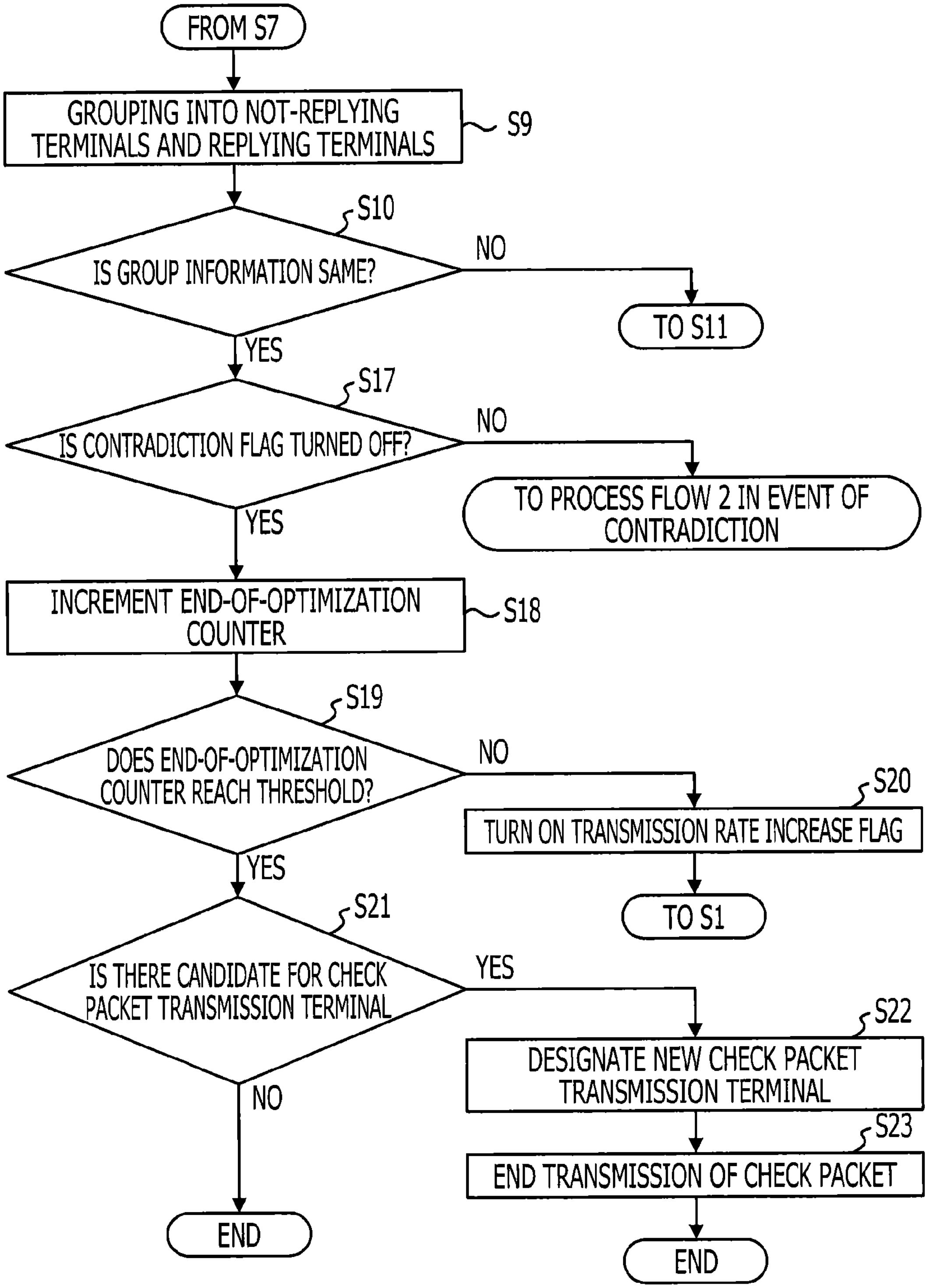
FIGS. 14A and 14B illustrate an exemplary distribution route construction process.
Figure 14B:
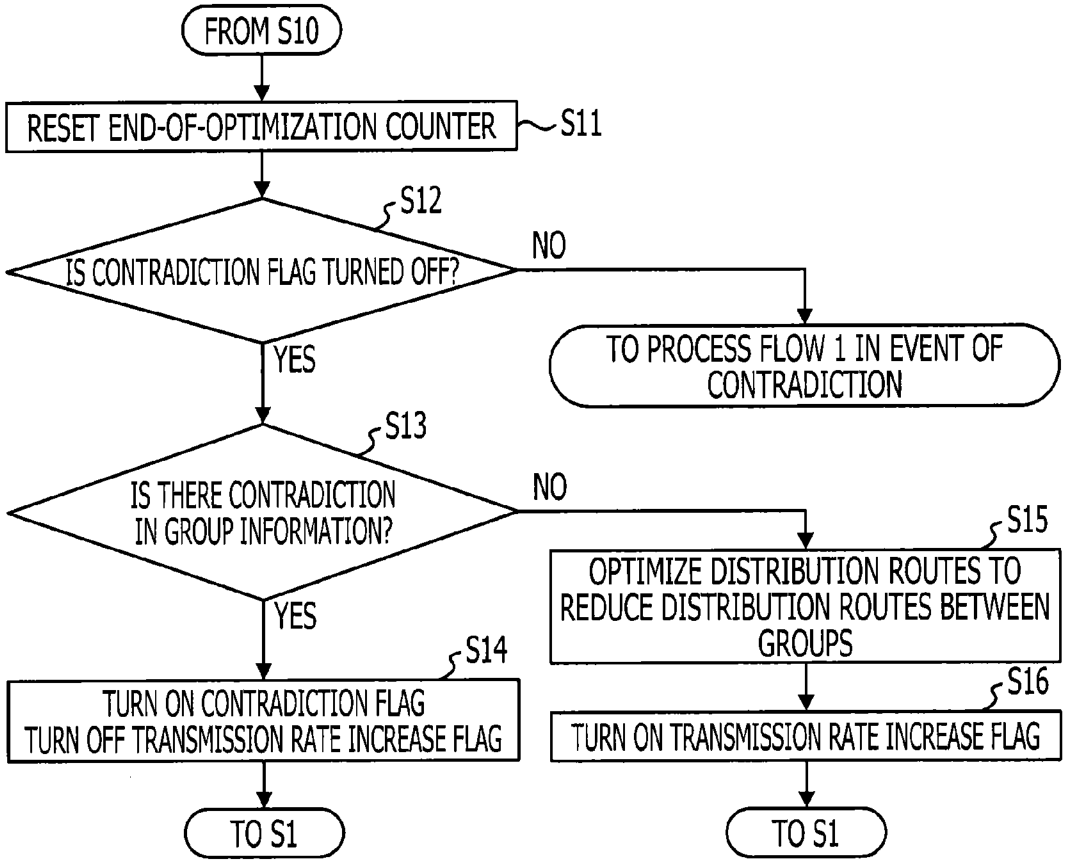

FIG. 13 and FIGS. 14A and 14B illustrate an exemplary distribution route construction process. The process illustrated in FIGS. 13, 14A and 14B is executed by the overall control unit 47 in the check packet transmission terminal. Some one terminal in the sub-network of FIG. 7 which has a distribution route with respect to the outside of the sub-network of FIG. 7, for example, the node #4, may be set as the check packet transmission terminal.

Referring to FIG. 13, in an operation S1, the check packet transmission terminal increments the sequence number per check packet and set the incremented sequence number. In an operation S2, the check packet transmission terminal determines whether a transmission rate increase flag is turned on. If the transmission rate increase flag is turned on, a transmission rate, e.g., the number of check packets transmitted once, is increased in an operation S3. When the previous number of check packets is set to k, the number of check packets to be now transmitted is increased to, e.g., $\alpha$ ($\alpha$ is a real number of one or more, e.g., $\alpha=2$) times in the operation S3. In an operation S4, the check packet transmission terminal broadcasts the check packet to the nodes #1 to #3 and #5 to #8 within the sub-network. The broadcasting of the check packet is represented by arrows in the form of dotted lines in FIG. 12.

The check packet transmission terminal receives the reply packet from each of the terminals (node #1 to #8) in an operation S5, and checks the presence or the absence of any not-replying terminal in an operation S6. In the absence of the not-replying terminal, the check packet transmission terminal turns on the transmission rate increase flag in an operation S8. The process returns to the operation S1.

Figure 15:
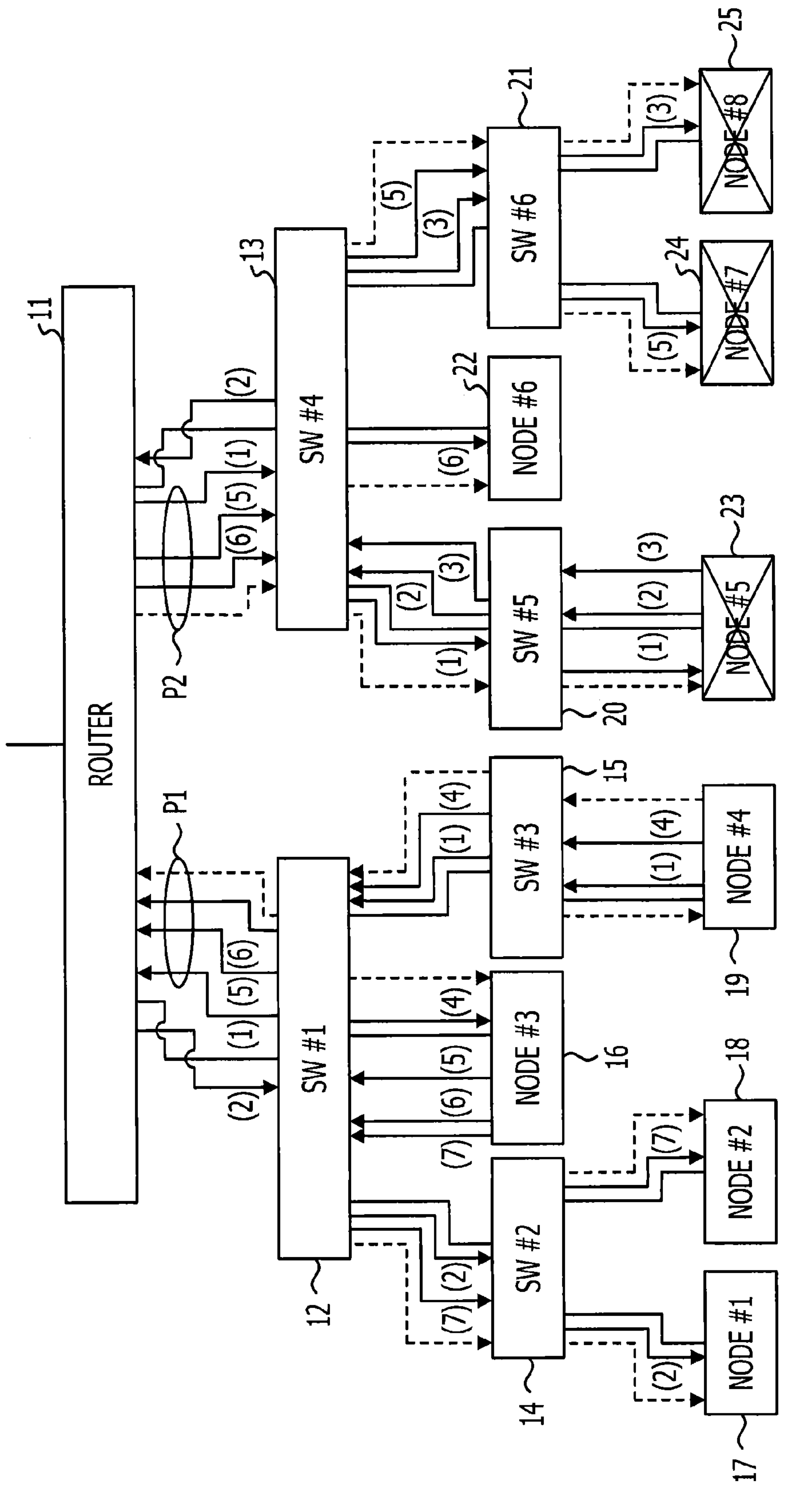
FIG. 15 illustrates an exemplary terminal from each of which there is no reply.

In the presence of the not-replying terminal, the check packet transmission terminal turns off the transmission rate increase flag in an operation S7. The process proceeds to an operation S9, illustrated in FIG. 14A, in which the not-replying terminal and the replying terminal are separately grouped. FIG. 15 illustrates an exemplary not-replying terminal. For example, when the reply is not returned from the nodes #5 to #8 as illustrated in FIG. 15, it is estimated that there is a high possibility of congestion in paths included in routes P1 and P2 between the router 11 and the switch 12, 13, respectively, illustrated in FIG. 15. Therefore, the nodes #1 to #4 from each of which the reply has been returned are set to a group A, and the nodes #5 to #8 from each of which the reply has not been returned are set to a group B. Thus, the group information holding unit 49 in the check packet transmission terminal holds the group information in the form of (nodes #1, #2, #3, #4) (nodes #5, #6, #7, #8).

In an operation S10, the check packet transmission terminal detects whether the current group information exists in the past group information. If the current group information does not exist in the past group information, the check packet transmission terminal resets the end-of-optimization counter in an operation S11. The end-of-optimization counter may be used to determine whether further grouping is enabled or not by continuing the check.

In an operation S12, the check packet transmission terminal determines whether a contradiction flag is turned off. If the contradiction flag is turned off, the check packet transmission terminal collates the current group information with the past group information held in the group information holding unit 49 in an operation S13, thereby checking whether there is a contradiction in the group information. If there is a contradiction, the check packet transmission terminal turns on the contradiction flag and turns off the transmission rate increase flag in an operation S14. The processing returns to the operation S1.

Figure 16:
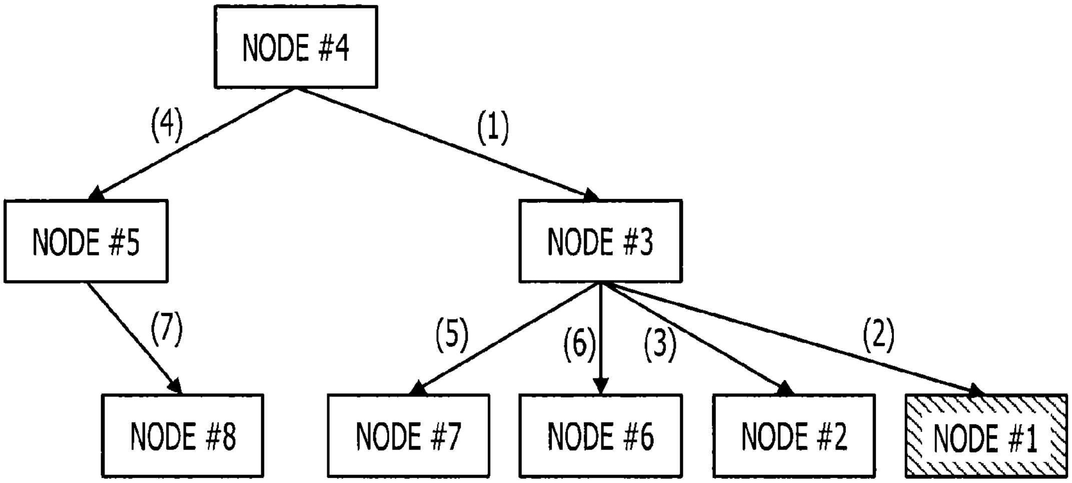
FIG. 16 illustrates an exemplary reconstruction of distribution routes.
Figure 17:
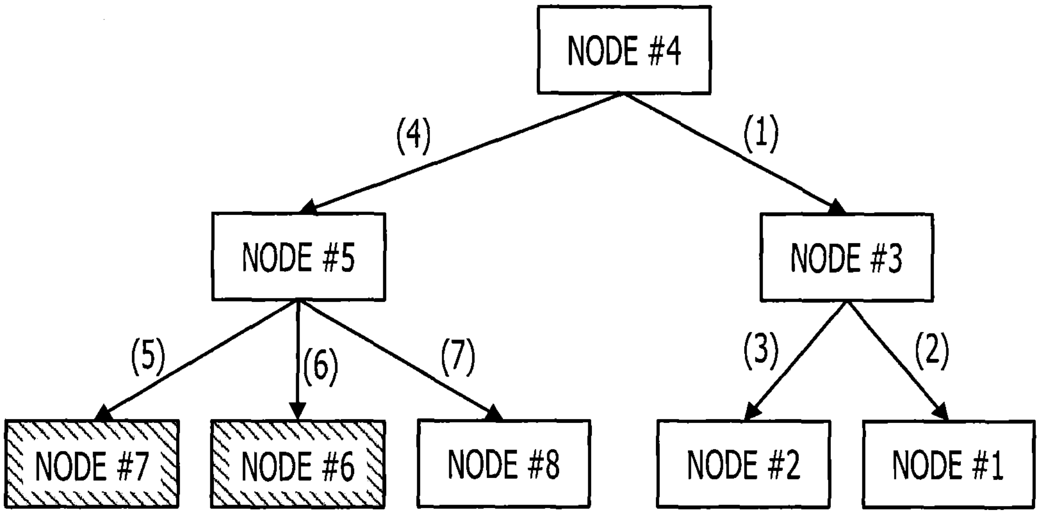
FIG. 17 illustrates an exemplary reconstruction of distribution routes.

If there is no contradiction, the check packet transmission terminal reconstructs distribution routes in an operation S15 such that the distribution routes between the groups A and B is reduced. FIGS. 16 and 17 illustrate an exemplary reconstruction of distribution routes. The node #4 serving as the check packet transmission terminal recognizes the logical distribution routes illustrated in FIG. 8, for example, based on the reply packet from each terminal. Thus, the number of distribution routes between the groups A and B is reduced to, e.g., one path by coupling the node #1 to the downstream of the node #3 as illustrated in FIG. 16, and by coupling the nodes #6 and #7 to the downstream of the node #5 as illustrated in FIG. 17.

In the node #4, as illustrated in FIG. 17, a route rearrangement instruction to couple the nodes #6 and #7 to the downstream of the node #5 is transmitted to the nodes #1, #6 and #7 from the instruction unit 42.

Figure 18:
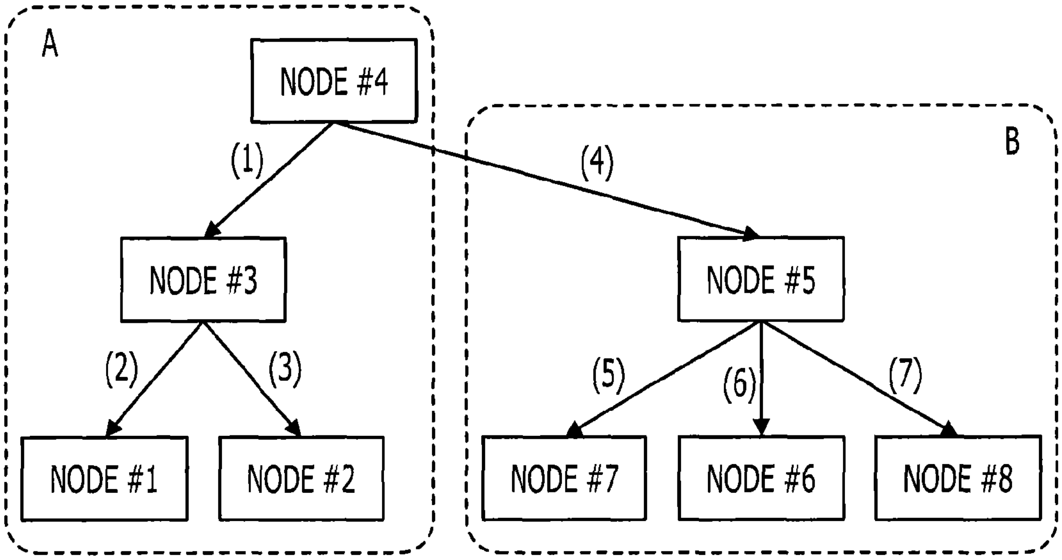
FIG. 18 illustrates an exemplary data distribution route.
Figure 19:
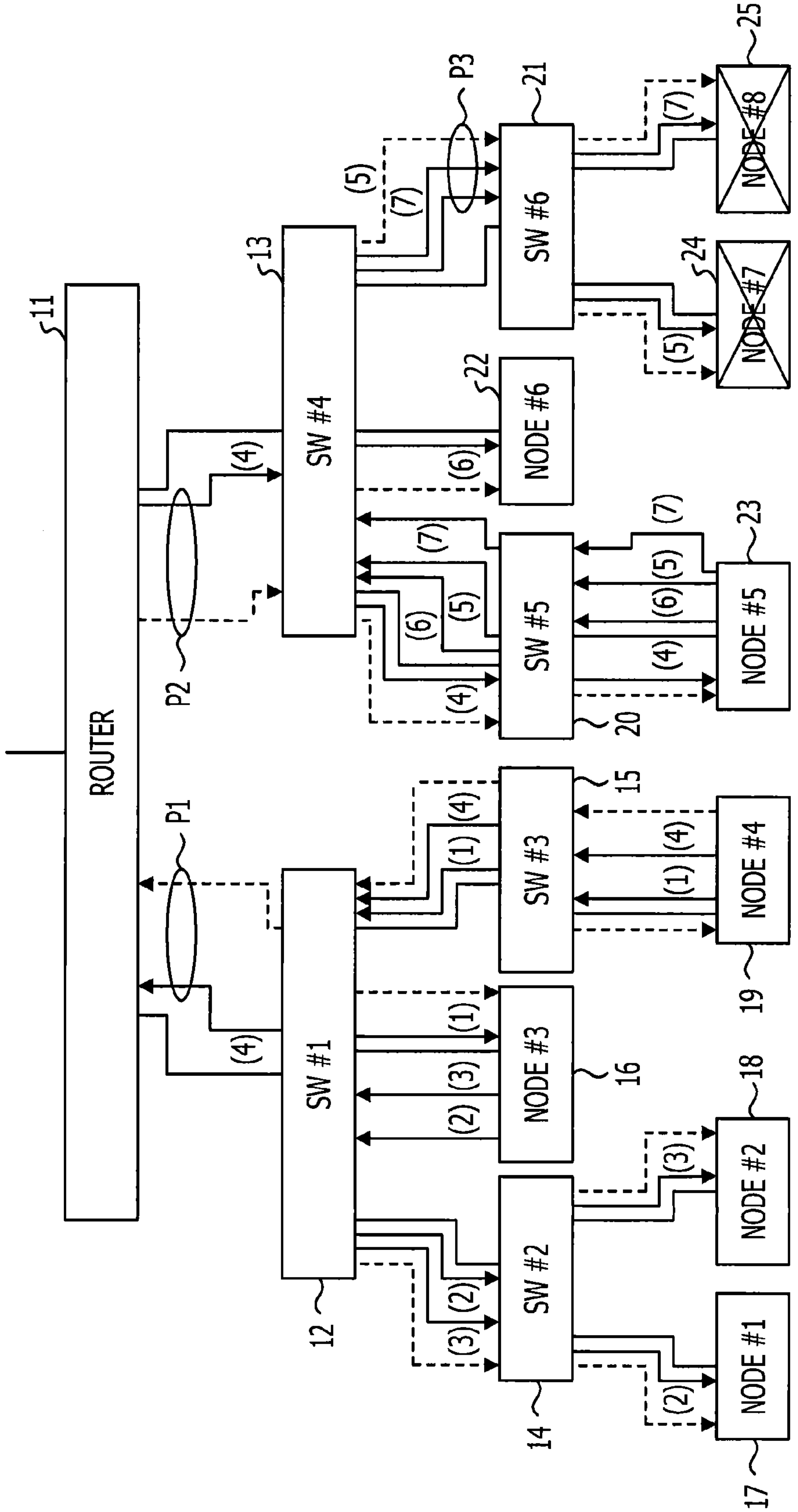
FIG. 19 illustrates an exemplary terminal from each of which there is no reply.

FIGS. 18 and 19 illustrate an exemplary one example of data distribution route. FIG. 18 illustrates logical data distribution routes of a logical network. In FIG. 19, the physical network configuration illustrated in FIG. 8 and the logical data distribution routes illustrated in FIG. 18 are superimposed with each other. A total path length illustrated in FIG. 19 may be reduced to, e.g., 26.

In an operation S16 illustrated in FIG. 14B, the check packet transmission terminal turns on the transmission rate increase flag. The process returns to the operation S1. With the reconstruction of the distribution routes performed in the operation S15, the total path length illustrated in FIG. 19 is reduced to 26. Since the distribution data traffic in a route, such as routes P1 and P2 illustrated in FIG. 19 where congestion occurs with a high possibility, is reduced, the check is performed at an increased transmission rate of the check packet.

When the reply is not returned from the nodes #7 and #8 due to congestion occurred in any path of a route P3 illustrated in FIG. 19, the nodes #7 and #8 are set as a group C. The group information is stored in the form of (nodes #1, #2, #3, #4) (nodes #5, #6, (nodes #7, #8)) in the group information holding unit 49 of the check packet transmission terminal. The distribution routes are reconstructed by coupling the node #8 to the downstream of the node #7 such that the number of distribution routes between the group B and the group C is reduced to one.

Figure 20:
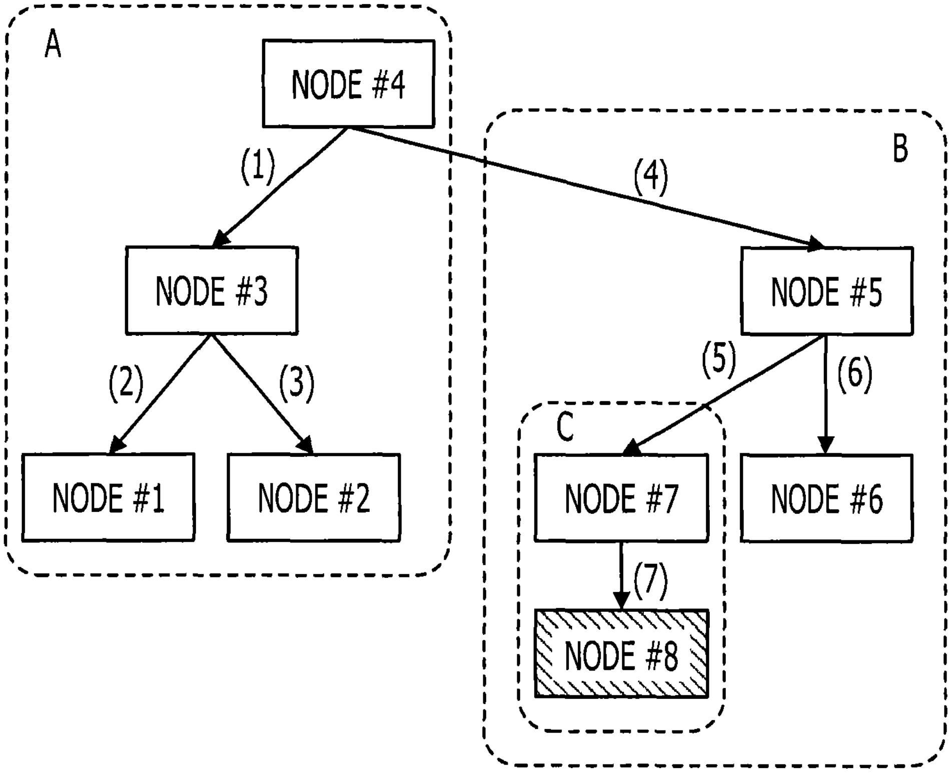
FIG. 20 illustrates an exemplary data distribution route.
Figure 21:
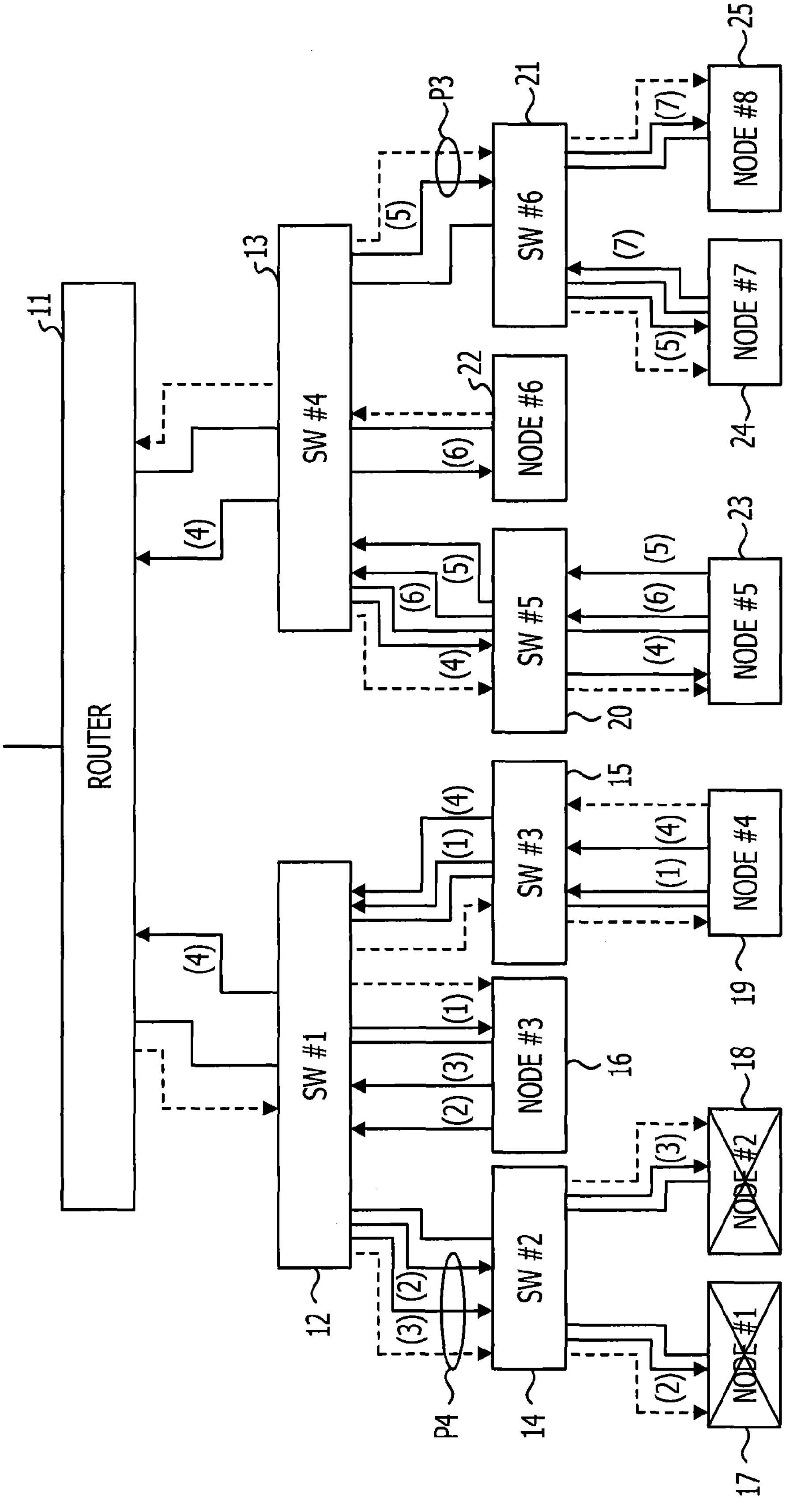
FIG. 21 illustrates an exemplary terminal with no reply.

FIG. 20 illustrates an exemplary data distribution route. FIG. 20 illustrates a logical network including logical data distribution routes. In FIG. 21, the physical network configuration illustrated in FIG. 8 and the logical data distribution routes illustrated in FIG. 20 are superimposed with each other. A total path length illustrated in FIG. 21 is reduced to, e.g., 24.

When the reply is not returned from the nodes #5 to #8 as a result of continuing the check in the state of FIG. 21, it is determined in the operation S10 of FIG. 14 that the current group information matches with the past group information, and the process proceeds to an operation S17. If there is no contradiction in the group information, the contradiction flag is turned off as a result of determination in the operation S17, and hence the process proceeds to an operation S18. If the contradiction flag is turned on as a result of the determination in the operation S17, the process proceeds to a process when contradiction occurs.

The check packet transmission terminal increments the end-of-optimization counter by one in an operation S18. When the reply is not returned from the nodes #5 to #8 many times, the end-of-optimization counter reaches a threshold, whereupon the process proceeds from an operation S19 to an operation S21. The threshold may be set to, e.g., 10. In the operation S21, it is determined whether there is at least one candidate for the check packet transmission terminal. For example, one or more terminals within the not-replying group, from which the reply is not returned when the group information is to be held, are provided as candidates for the check packet transmission terminal.

If there are candidates for the check packet transmission terminal, in an operation 22, the node #4 serving as the check packet transmission terminal selects, e.g., the node #6 in the not-replying group B illustrated in FIG. 20, as a new check packet transmission terminal, from among the candidates for the check packet transmission terminal and transmits designation information from the check-packet transmission terminal destination unit 43 thereof. When selecting a new check packet transmission terminal from the candidates, the node #5 or the node #6, for example, which is a terminal included in the not-replying group and is not included in the sub-group, may be selected as the new check packet transmission terminal.

In an operation S23, the node #4, for example, the current check packet transmission terminal, ends the transmission of the check packet. The transmission rate of the check packet, the latest logical network configuration, and the latest group information are notified to the node #6 so that the node #6 continuously executes the optimization of the data distribution routes.

Figure 22:
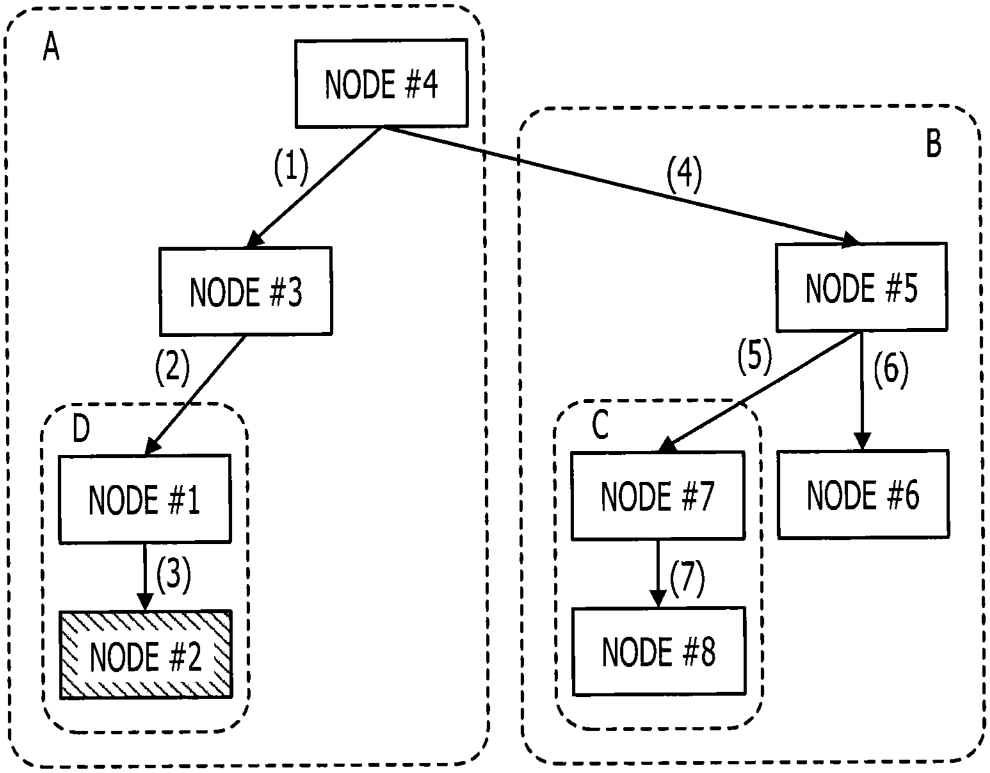
FIG. 22 illustrates an exemplary data distribution route.

FIG. 22 illustrates an exemplary data distribution route. As a result of continuing the check from the node #6 while increasing the transmission rate of the check packet as compared with that when congestion occurs, the reply may not be returned from the nodes #1 and #2. In that case, as illustrated in FIG. 22, the nodes #1 and #2 are set as a group D, and new group information is held. The distribution routes are then reconstructed such that the number of distribution routes between the groups A and D is reduced to one. In FIG. 22, the reconstruction of the distribution routes is performed by coupling the node #2 to the downstream of the node #1.

Figure 23:
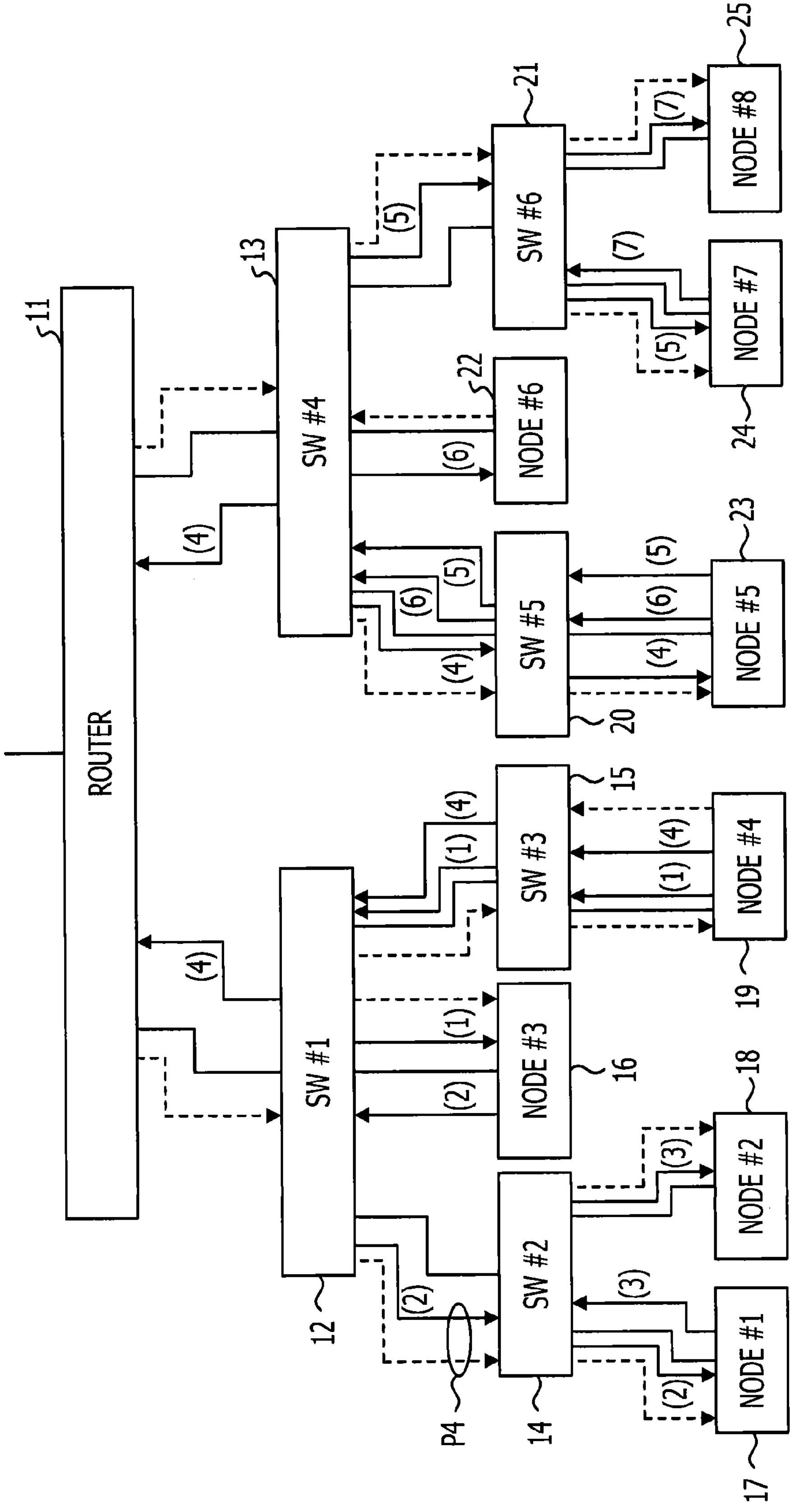
FIG. 23 illustrates an exemplary data distribution route.

FIG. 23 illustrates an exemplary data distribution route. In FIG. 23, the physical network configuration illustrated in FIG. 8 and the logical data distribution routes illustrated in FIG. 22 are superimposed with each other. A total length of paths illustrated in FIG. 23 is reduced to, e.g., 23. Because the network operates with full duplex communication, the check packet is transmitted in a two-way manner, for example, in a distribution direction toward the node #6 from the node #4 and in an opposite direction toward the node #4 from the node #6. Therefore, a new congestion path, e.g., a congestion route P4 illustrated in FIG. 21, differing from the current congestion path may be found.

Optimum data distribution routes having a smaller total path length and higher efficiency may be found at an earlier point through the check and the reconstruction of the data distribution routes.

Figure 24:
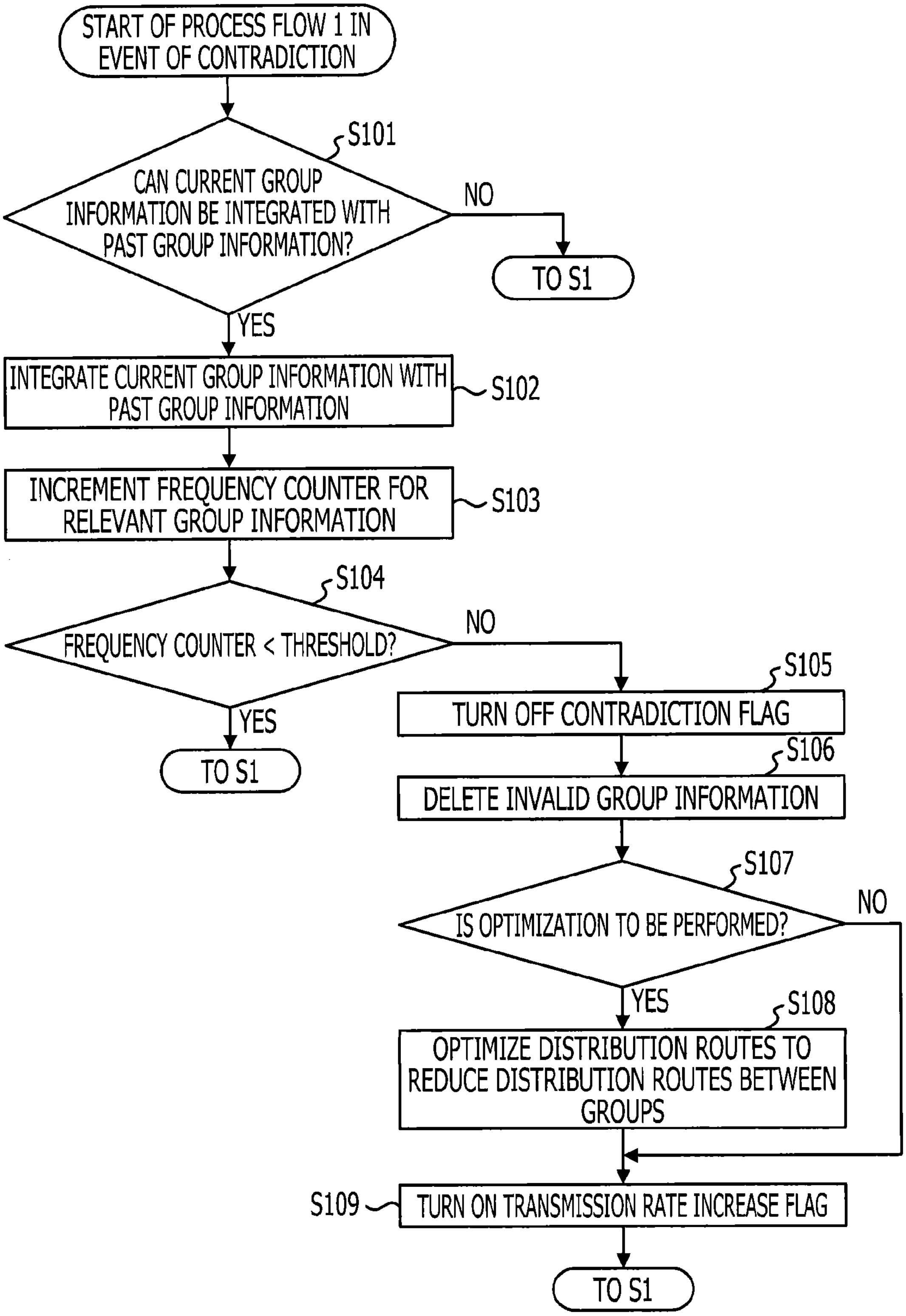
FIG. 24 illustrates an exemplary process in the event of contradiction.
Figure 25:
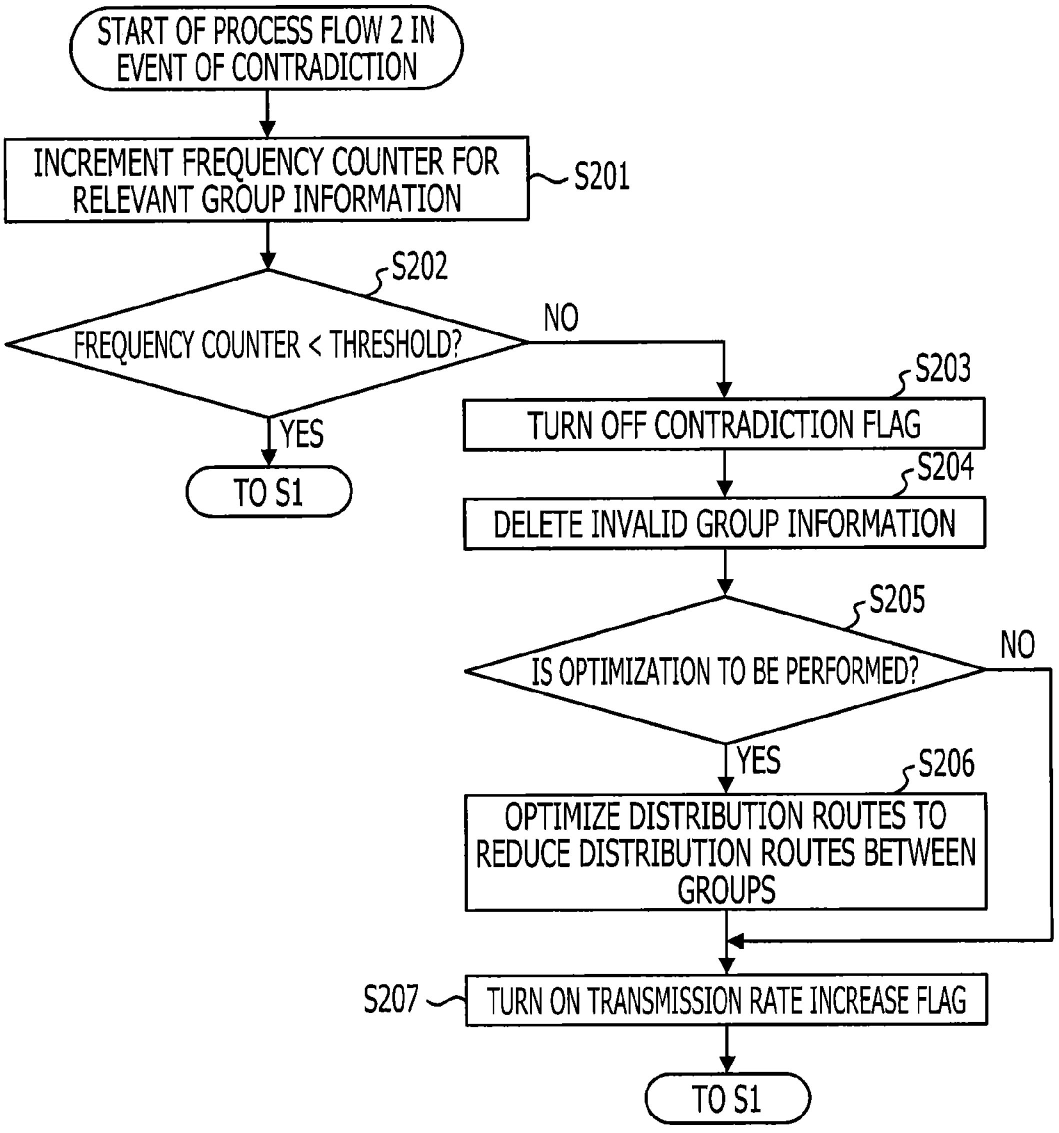
FIG. 25 illustrates an exemplary process in the event of contradiction.

FIGS. 24 and 25 illustrate an exemplary process in the event of contradiction. For example, when a packet loss of the check packet occurs in different Layer-2 switches at the same time, a contradiction may arise in the group information.

In FIG. 15, for example, the reply may not be returned from the nodes #5 to #8. The nodes #1 to #4 from which the reply has been returned is set as a group A, and the nodes #5 to #8 from which the reply has not been returned is set as a group B. Group information (referred as first group information) in the form of (nodes #1, #2, #3, #4) (nodes #5, #6, #7, #8) is held.

When the check is continued after the optimization as illustrated in FIGS. 18 and 19, the reply may not be returned from the nodes #1, #2, #7 and #8. The group information is set to (nodes #3, #4, #5, #6) (nodes #1, #2, #7, #8) (referred as second group information). Therefore, a contradiction arises between the first group information and the second group information. The process proceeds from the operation S13, illustrated in FIG. 14, to the operation S14 in which the contradiction flag is turned on for target groups, for example, the first group information and the second group information. A check is performed to resolve the contradiction.

For example, the reply may not be returned from the nodes #7 and #8. The group information is set to (nodes #1, #2, #3, #4, #5, #6) (nodes #7, #8) (referred as third group information). Because the third group information is different from the past group information, the process proceeds from the operation S10, illustrated in FIG. 14, to the operation S11. Because the contradiction flag is turned on, the process proceeds from the operation S12 to a process when contradiction occurs.

In the process flow 1 executed in the event of contradiction, illustrated in FIG. 24, the check packet transmission terminal determines in an operation S101 whether the current group information obtained at this time can be integrated with the past group information. For example, it is determined that the third group information can be integrated with the first group information. In an operation S102, the check packet transmission terminal integrates the third group information with the first group information and sets the group information to (nodes #1, #2, #3, #4) (nodes #5, #6, (#7, #8)) (referred as fourth group information). A contradiction flag for the group information after the integration, for example, the fourth group information is turned on.

In an operation S103, the check packet transmission terminal increments the frequency counter for each of the first group information before the integration and the third group information after the integration. In an operation S104, the check packet transmission terminal determines whether a value of the frequency counter is smaller than a threshold. If the value of the frequency counter is smaller than the threshold, the process returns to the operation S1. When the threshold in the operation S19 is, e.g., 10, the threshold in the operation S104 may be, e.g., about 5.

If the value of the frequency counter is not smaller than the threshold, the check packet transmission terminal turns off, in an operation S105, the contradiction flag for each of the target groups, i.e., for the first to third group information. The check packet transmission terminal deletes the invalid group information, e.g., the second group information, in an operation S106, and determines in an operation S107 whether the optimization is to be performed. If the optimization is to be performed, the reconstruction of the distribution routes is performed in an operation S108. The optimization is performed, for example, such that the number of distribution routes between the nodes #5 and #6 and the nodes #7 and #8 is reduced to one. For example, as illustrated in FIG. 20, the node #8 is coupled to the downstream of the node #7. In an operation S109, the check packet transmission terminal turns on the transmission rate increase flag. The process returns to the operation S1.

In the event of contradiction, the reply may not be returned from the nodes #5 to #8. The current group information obtained at this time is substantially the same as the past group information, and the contradiction flag is turned on. Therefore, the process proceeds from the operation S10, illustrated in FIG. 14, to the process flow 2 executed in the event of contradiction, illustrated in FIG. 25, through the operation S17.

In the process flow 2 executed in the event of contradiction, illustrated in FIG. 25, the check packet transmission terminal increments the frequency counter for the target group, e.g., the first group information, in an operation S201, and then determines in an operation S202 whether a value of the frequency counter is smaller than a threshold. If the value of the frequency is smaller than the threshold, the process proceeds to the operation S1. When the threshold in the operation S19 is, e.g., 10, the threshold in the operation S202 may be, e.g., about 5.

If the value of the frequency counter is not smaller than the threshold, the check packet transmission terminal turns off, in an operation S203, the contradiction flag for each of the target groups, i.e., for the first and second group information. In an operation S204, the check packet transmission terminal deletes the invalid group information, e.g., the second group information. Because the optimization of the distribution routes has already been performed, the process proceeds from an operation S205 to an operation S207. After turning on the transmission rate increase flag (S207), the process returns to the operation S1. If it is determined in the operation S205 that the optimization is to be performed, the reconstruction of the distribution routes is performed in an operation S206.

Even when a contradiction arises in the group information, the contradiction is resolved through the check of the occurrence frequency of the target group information, and the optimization of the distribution routes is performed.

The data distribution routes in a P2P network, which are constructed within a sub-network, may be optimized at an earlier point.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A distribution route construction method comprising:

transmitting, in a data distribution system, at least one check packet to a plurality of terminals within a network from a check packet transmission terminal;

checking whether each of the plurality of terminals transmits a reply packet in reply to the check packet;

grouping, when the reply packet is not received from at least one of the plurality of terminals, the plurality of terminals into a first terminal group including a first terminal whose reply packet reaches the check packet transmission terminal and a second terminal group including a second terminal whose reply packet does not reach the check packet transmission terminal;

changing a designation terminal for data communication to reduce communication data traffic between the first terminal group and the second terminal group;

reconstructing distribution routes based on the checking and the changing; and setting a flag indicating that the number of check packets to be transmitted to each of the plurality of terminals are increased in a next check when reply packets have been received from all of the terminals to which check packets have been transmitted.

2. The distribution route construction method according to claim 1, further comprising, holding group information relating to the first terminal group and the second terminal group.

3. The distribution route construction method according to claim 1, wherein the data distribution system includes logical data distribution routes independent of a physical network configuration.

4. The distribution route construction method according to claim 1, further comprising stopping the increase in the number of check packets when group information relating to the first terminal group and the second terminal group is different from previous group information.

5. The distribution route construction method according to claim 4, further comprising resuming the increase in the number of check packets when a difference between group information relating to the first terminal group and the second terminal group and previous group information is resolved.

6. The distribution route construction method according to claim 1, wherein the data distribution system performs P2P data distribution.

7. The distribution route construction method according to claim 1, wherein the check packet is transmitted by broadcasting or multicasting.

8. A distribution route construction method comprising: transmitting, in a data distribution system, at least one check packet to a plurality of terminals within a network from a check packet transmission terminal;

checking whether each of the plurality of terminals transmits a reply packet in reply to the check packet;

grouping, when not receiving the reply packet from at least one of the plurality of terminals, the plurality of terminals into a first terminal group including a first terminal whose reply packet reaches the check packet transmission terminal and a second terminal group including a second terminal whose reply packet does not reach the check packet transmission terminal;

changing a designation terminal for data communication to reduce communication data traffic between the first terminal group and the second terminal group;

reconstructing distribution routes based on the checking and the changing; and transmitting designation information from the check packet transmission terminal to one terminal in the second terminal group to become a new check packet transmission terminal when the one terminal receives the designation information and when group information relating to the first terminal group and the second terminal group is not changed.

9. The distribution route construction method according to claim 8, wherein, the new check packet transmission terminal transmits the check packet instead of the current check packet transmission terminal.

10. The distribution route construction method according to claim 8, further comprising transmitting, by the one terminal, check packets to the plurality of terminals when the one terminal becomes the new check packet transmission terminal after the one terminal receives the designation information.

11. The distribution route construction method according to claim 8, wherein the check packet transmission terminal ends the transmission of the check packets after transmitting designation information.

12. A terminal device comprising: a processor configured to execute a program; and a memory configured to store the program, the processor, based on the program, performs operations to: check, in accordance with a transmission of at least one check packet to a plurality of terminals within a network in a data distribution system, whether each of the plurality of the terminals transmits a reply packet in reply to the at least one check packet;

group, when the reply packet is not received from at least one of the plurality of terminals, the plurality of terminals into a first terminal group including a first terminal whose reply packet reaches the checking unit and a second terminal group including a second terminal whose reply packet does not reach the checking unit;

change a designation terminal for data communication to reduce a number of distribution routes between the first terminal group and the second terminal group;

reconstruct distribution routes based on the checking and the changing; and set a flag indicating that the number of check packets to be transmitted to each of the plurality of terminals are increased in a next check when reply packets have been received from all of the terminals to which check packets have been transmitted.

13. The terminal device according to claim 12, wherein the data distribution system includes logical data distribution routes independent of a physical network configuration.

14. The terminal device according to claim 12, wherein the processor stops the increase in the number of check packets when group information relating to the first terminal group and the second terminal group is different from previous group information.

15. The terminal device according to claim 14, wherein the processor resumes the increase in the number of check packets when a difference between group information relating to the first terminal group and the second terminal group and previous group information is resolved.

16. The terminal device according to claim 12, wherein the processor transmits information designating one terminal in the second terminal group, as a check packet transmission terminal that transmits the check packet to the plurality of terminals, to the one terminal when group information relating to the first terminal group and the second terminal group is not changed.

17. The terminal device according to claim 16, wherein the new check packet transmission terminal transmits the check packet instead of a current check packet transmission terminal.

* * * * *